(12) United States Patent
Nishiyama

(10) Patent No.: US 7,154,513 B2
(45) Date of Patent: Dec. 26, 2006

(54) METHOD AND SYSTEM FOR DISPLAYING IMAGES

(75) Inventor: Sumio Nishiyama, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 11 days.

(21) Appl. No.: 09/988,617

(22) Filed: Nov. 20, 2001

(65) Prior Publication Data

US 2002/0054043 A1  May 9, 2002

(30) Foreign Application Priority Data

Nov. 28, 2000 (JP) .............................. 2000-361128

(51) Int. Cl.
*G09G 5/00* (2006.01)
*G06T 11/20* (2006.01)

(52) U.S. Cl. ..................... 345/667; 345/441; 345/684

(58) Field of Classification Search ............ 345/428, 345/423, 660, 667, 672, 682, 684, 688, 442
See application file for complete search history.

(56) References Cited

U.S. PATENT DOCUMENTS

| | | | | |
|---|---|---|---|---|
| 4,646,251 A | * | 2/1987 | Hayes et al. ............... | 345/423 |
| 5,172,102 A | * | 12/1992 | Iwamura et al. ............ | 345/688 |
| 5,200,738 A | * | 4/1993 | Fumoto et al. ............. | 345/538 |
| 5,434,591 A | * | 7/1995 | Goto et al. ................. | 345/688 |
| 6,002,406 A | * | 12/1999 | Zhao .......................... | 345/581 |
| 6,188,408 B1 | * | 2/2001 | Suzuoki ...................... | 345/423 |
| 6,208,347 B1 | * | 3/2001 | Migdal et al. .............. | 345/419 |
| 6,348,921 B1 | * | 2/2002 | Zhao et al. .................. | 345/428 |
| 6,392,647 B1 | * | 5/2002 | Migdal et al. .............. | 345/423 |
| 6,411,274 B1 | * | 6/2002 | Watanabe et al. ........... | 345/684 |
| 6,441,819 B1 | * | 8/2002 | Suzuoki ...................... | 345/423 |
| 6,456,288 B1 | * | 9/2002 | Brockway et al. .......... | 345/428 |

FOREIGN PATENT DOCUMENTS

EP    0 549 944 A2    7/1993
GB    2 313 277 A     11/1997

* cited by examiner

*Primary Examiner*—Ryan Yang
(74) *Attorney, Agent, or Firm*—Arent Fox PLLC

(57) ABSTRACT

Vector data indicating a plurality of points for representing an image is classified for storage under three groups: a group 1 of the vector data DP1, DP5, DP9 indicating indispensable points P1, P5, P9 required for recognition of graphics G; a group 2 of the vector data DP3, DP7 indicating first supplementary points P3, P7 for supplementing the points P1, P5, P9; and a group 3 of the vector data DP2, DP4, DP6, DP8 indicating second supplementary points P2, P4, P6, P8 for further supplementing the indispensable points P1, P5, P9 and first supplementary points P3, P7. When displaying an image, a selection is made between displaying the image represented by the group 1 and displaying the image represented by the group 1 plus the groups 2 and 3.

10 Claims, 2 Drawing Sheets

| GROUP 1 | DP1<br>DP5<br>DP9 |
|---|---|
| GROUP 2 | DP3<br>DP7 |
| GROUP 3 | DP2<br>DP4<br>DP6<br>DP8 |

METHOD AND SYSTEM FOR DISPLAYING IMAGES

BACKGROUND OF THE INVENTION

1. Field of the Invention

This invention relates to a method for displaying images on a display and a system for implementing the method.

The present application claims priority from Japanese Application No. 2000-361128, the disclosure of which is incorporated herein by reference for all purposes.

2. Description of the Related Art

Information technology devices having a display for displaying a variety of information, such as a personal computer, a portable telephone and a navigation system, have achieved widespread use in recent years.

For example, personal computers display vector-mode graphic data, e.g. a map image, stored on storage medium such as a hard disk (HD) and a CD-ROM, on the display for users to avail themselves of. A display with a more detailed image typically requires a larger amount of data, which tends to increase the plotting time to display the image on the display.

In a large amount of data of an image to be displayed, it takes much time to shift the screen during scrolling. This produces the problem of interfering with the smooth screen operation.

Particularly, when an image of a large amount of data is displayed on an information technology device having a small memory capacity for displaying images, such as a portable telephone, the information technology device tends to take an extremely long time to display the image.

In this case, user's requests regarding the use of the image information vary in different cases, for example, when a highly precise image is required although it takes much time to display the image, and when a faster display speed is required regardless of the precision of the image.

However, various conventional kinds of information technology devices display a vector image on the display uniformly regardless of the amount of image data. Thus it is impossible for the conventional information equipment to respond to the varied needs of users in different cases.

SUMMARY OF THE INVENTION

The present invention has been made to solve the problems produced in displaying an image on the display of a conventional information technology device as described above.

It is therefore a first object of the present invention to provide a method for displaying an image which enables a user to, when a vector image is displayed on a display of an information technology device, arbitrarily set the precision of the image to be displayed and a display speed for displaying the image according to user's requirements, and to set a display speed for displaying the image in accordance with operation mode of the information technology device or the image display capability of the information technology device.

It is a second object of the present invention to provide a system of displaying an image for implementing the above method.

To attain the first object, a method of displaying an image according to a first aspect of the present invention is a method of displaying a vector-mode image in which a plurality of points designated on a screen are linked to display the required image. The method has the feature of including the steps of: classifying vector data, indicating a plurality of points for displaying the image, into a group of data indicating indispensable points required for recognizing the image, and a group of data indicating supplementary points for supplementing the indispensable points to display a more precise image, for storage on a storage member; and selecting between displaying the image represented by only the data group indicating the indispensable points and displaying the image represented by the data group indicating the indispensable points plus the data group indicating the supplementary points, when the image is displayed.

With the method of displaying the image according to the first aspect, the image data for displaying the required image on the display of a personal computer or the like is stored in advance on a storage medium, such as a CD-ROM, a hard disk or a database in an information providing server which provides image information through the Internet, after classification into separate groups: one group of vector data indicating the indispensable points required for a minimum recognition of the image, and the other group of vector data indicating the supplementary points inserted between two of the indispensable points in order to provide a display of the image with a higher precision than that of the image represented by only the indispensable points.

In the displaying of an image, through the operation of the user or through the control of a CPU of the personal computer or the like, the selection is automatically made between a reading of merely the data group indicating the indispensable points for displaying the vector image represented merely by the indispensable points, and a reading of both the data groups indicating the indispensable points and the supplementary points for supplementing the indispensable points in order to display the vector image with high precision.

According to the first aspect, therefore, the selection of the image display represented by the data group indicating the indispensable points allows the image to be displayed at high speed. Further, the selection of the image display represented by the data group indicating the indispensable points and the data group indicating the supplementary points allows the image to be displayed with high precision. As a result, the vector image can be displayed appropriately to the user's needs and/or the ability of the system of providing a display.

To attain the first object, the method of displaying the image according to a second aspect of the present invention has the feature, in addition to the configuration of the first aspect, that the vector data indicating the supplementary points are classified into a plurality of data groups for supplementing the indispensable points in stages for storage on the storage member, and a selection among the classified plural data groups indicating the supplementary points is made in stages for supplementing the indispensable points in stages to display the image.

According to the method of displaying the image of the second aspect, the vector data indicating the supplementary points are classified into a plurality of data groups, i.e. a first group of the supplementary points inserted between the indispensable points for supplement and a second group of the supplementary points further inserted between the indispensable point and the first supplementary point for further supplement, in order to supplement the indispensable points in stages for the image display.

For this configuration, when displaying an image, the setting of the selected stage from the stages of the data groups of supplementary points allows the vector image to be displayed further appropriately to the user's needs and/or the ability of the system for displaying.

To attain the first object, the method of displaying the image according to a third aspect of the present invention has the feature, in addition to the configuration of the first aspect, that the image is represented only by the data group indicating the indispensable points when being scrolled on a screen.

According to the method of displaying the image of the third aspect, in the scrolling of the image on the screen which needs a fast display, the vector image is represented only by the data group indicating the indispensable points. This achieves the satisfactory image display adapted to the scrolling on the screen.

To attain the first object, the method of displaying the image according to a fourth aspect of the present invention has the feature, in addition to the configuration of the first aspect, that the selection between displaying the image represented by the data group indicating the indispensable points and displaying the image represented by the data group indicating the indispensable points plus the date group indicating the supplementary points is made in accordance with the amount of data of the image.

According to the method of displaying the image of the fourth aspect, for example, when a vector image is represented by a great amount of image data or when a large amount of data is downloaded through the Internet or the like, the selection of the image display represented only by the data group of the indispensable points allows the transfer efficiency of the data to be significantly enhanced, resulting in displaying the image at high speed.

To attain the first object, the method of displaying the image according to a fifth aspect of the present invention has the feature, in addition to the configuration of the first aspect, that the selection between displaying the image represented only by the data group indicating the indispensable points and displaying the image represented by the data group indicating the indispensable points and the date group indicating the supplementary points is made in accordance with data memory capacity required for displaying the image.

According to the method of displaying the image of the fifth aspect, in a system including a memory or the like having a low data memory capacity for storing image data, e.g. a portable telephone, even when a vector image represented by a great amount of data is displayed, a fast image display is allowed.

To attain the second object, a system of displaying an image according to a sixth aspect of the present invention provides a display of a required vector-mode image by means of linking a plurality of points designated on a screen, and has the feature of including: a data storage member for classifying vector data, indicating a plurality of points for representing the image, into a data group indicating indispensable points required for a minimum recognition of the image, and a data group indicating supplementary points for supplementing the indispensable points to represent the more precise image, and for storing the vector data; and an image quality selection member for selecting between reading merely the data group indicating the indispensable points from the data storage member for displaying the image and reading the data group indicating the indispensable points plus the data group indicating the supplementary points from the data storage member for displaying the image.

With the system of displaying the image according to the sixth aspect, the image data for displaying the required image on a display of a personal computer or the like is stored in advance on a data storage member, such as a CD-ROM, a hard disk or a database in an information providing server which provides image information through the Internet, after classification into separate data groups: one group of the vector data indicating the indispensable points required for a minimum recognition of the image, and the other group of the vector data indicating the supplementary points each inserted between two of the indispensable points for supplement in order to provide a display of the image with a higher precision than that of the image represented by the indispensable points alone.

When displaying an image, for example, through the operation of the user or through the control of a CPU of the personal computer or the like, the image quality selection member automatically makes the selection between displaying the image represented only by the indispensable points and displaying the image with high precision by means of supplementing the indispensable points with the supplementary points, and then reads merely the data group indicating the indispensable points or reads the data group indicating the indispensable points and the data group indicating the supplementary points.

According to the sixth aspect, therefore, the selection of the image display represented by the data group indicating the indispensable points allows the image to be displayed at high speed. The selection of the image display represented by the data group indicating the indispensable points plus the data group indicating the supplementary points allows the image to be displayed with high precision. As a result, the image can be displayed appropriate to the user's needs and/or the ability of the system for displaying images.

To attain the second object, the system of displaying the image according to a seventh aspect of the present invention has the feature, in addition to the configuration of the sixth aspect, that the data storage member classifies the vector data indicating the supplementary points into a plurality of data groups for supplementing the indispensable points in stages and stores the vector data, and in the displaying of the image the image quality selection member selects among the classified plural data groups indicating the supplementary points in stages to supplement the indispensable points in stages.

According to the system of displaying the image of the seventh aspect, the vector data indicating the supplementary points is stored on the data storage member after being classified into a plurality of data groups, e.g. a first group of supplementary points inserted between the indispensable points and a second group of supplementary points further inserted between the indispensable points and the first supplementary points, in order to supplement the indispensable points in stages for the image display. In displaying an image, the image quality selection member selects a stage of the data group of the supplementary points to be read from the data storage member in accordance with the precision of the image to be displayed. This allows the vector image to be displayed further appropriate to the user's needs and/or the ability of the system for displaying images.

To attain the second object, the system of displaying the image according to an eighth aspect of the present invention has the feature, in addition to the configuration of the sixth aspect, that the image quality selection member selects the image display represented only by the data group indicating the indispensable points when the image is scrolled on a screen.

According to the system of displaying the image of the eighth aspect, in the scrolling of the image on a screen which needs a fast display, the image quality selection member selects the image display represented by the data group indicating the indispensable points. This achieves the satisfactory vector image display adapted to the scrolling on the screen.

To attain the second object, the system of displaying the image according to a ninth aspect of the present invention has the feature, in addition to the configuration of the sixth aspect, that the image quality selection member makes, in accordance with the amount of image data, the selection between displaying the image represented only by the data group indicating the indispensable points and displaying the image represented by the data group indicating the indispensable points plus the date group indicating the supplementary points.

According to the system of displaying the image of the ninth aspect, for example, when a vector image is represented by a great amount of image data or when a large amount of data is downloaded through the Internet or the like, the image quality selection member selects the image display represented by only the data group of the indispensable points. This allows the transfer efficiency of the data to be significantly enhanced, resulting in displaying the image at high speed.

To attain the second object, the system of displaying the image according to a tenth aspect of the present invention has the feature, in addition to the configuration of the sixth aspect, that the image quality selection member makes, in accordance with data memory capacity required for displaying the image, the selection between displaying the image represented only by the data group indicating the indispensable points and displaying the image represented by the data group indicating the indispensable points plus the data group indicating the supplementary points.

According to the system of displaying the image of the tenth aspect, in a system including a memory or the like having a low data memory capacity for storing image data, such as a portable telephone, for example, when a vector image of a great amount of data is displayed, the image quality selection member selects the image display represented only by the data group indicating the indispensable points to allow the image to be displayed at high speed.

To attain the second object, the system of displaying the image according to an eleventh aspect of the present invention has the feature, in addition to the configuration of the sixth aspect, that the data storage member is provided in a server providing image data through a computer network.

According to the system of displaying the image of the eleventh aspect, for example, when an image of a great amount of data is downloaded from an information providing server through a computer network such as the Internet, the image quality selection member selects the image display represented only by the data group indicating the indispensable points, to allow the transfer time for the data to be shortened, resulting in displaying the image at high speed.

These and other objects and features of the present invention will become more apparent from the following detailed description with reference to the accompanying drawings.

DETAILED DESCRIPTION OF THE PREFERRED EMBODIMENT

A preferred embodiment according to the present invention will be described hereinafter in detail with reference to the accompanying drawings.

Figure 1:
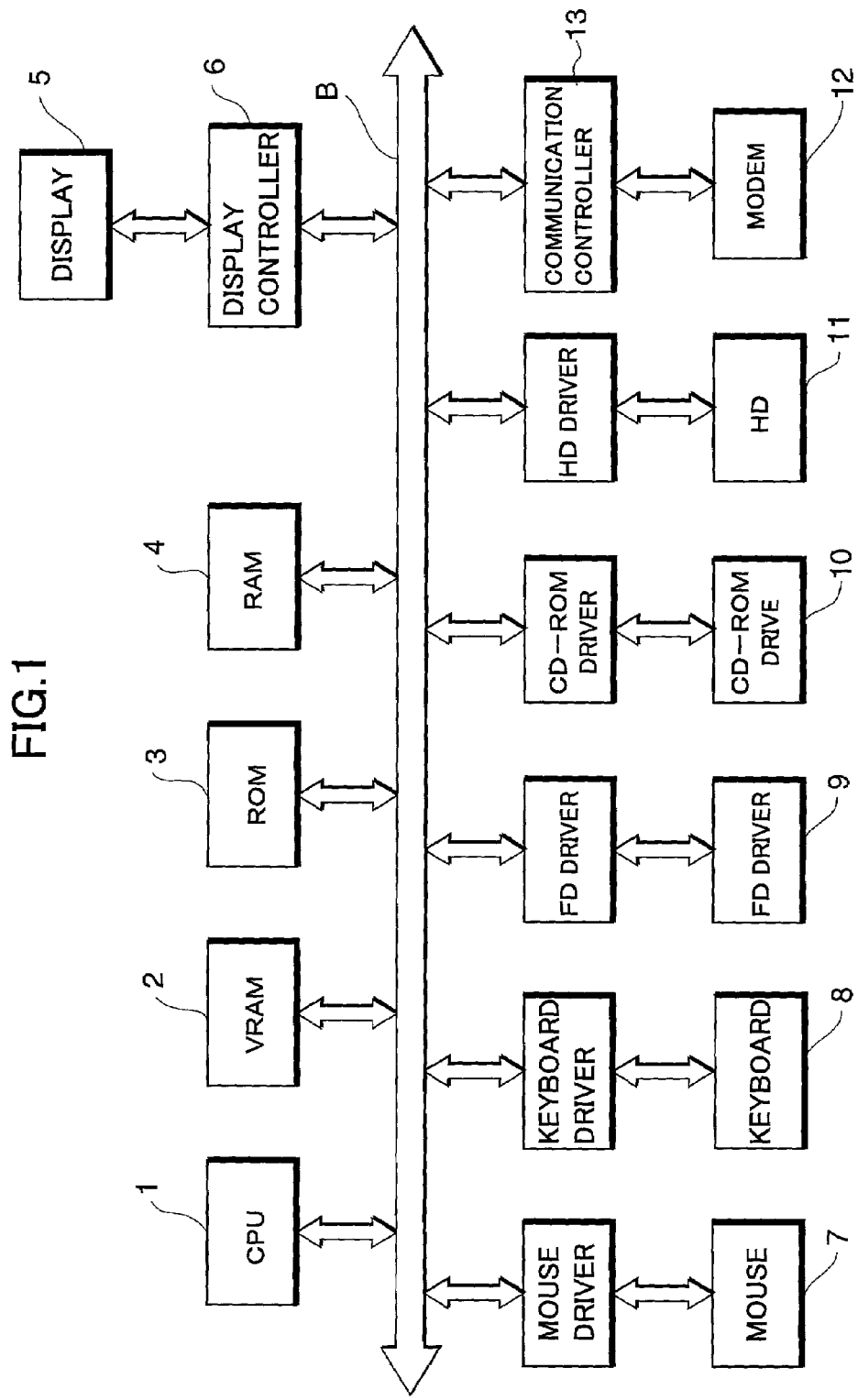
FIG. 1 is a block diagram illustrating a configuration of a personal computer embodying the present invention.

FIG. 1 is a block diagram illustrating an example of a configuration of a system of displaying an image embodying a method of displaying the image according to the present invention.

The present invention is applicable to a variety of image display devices such as in a portable telephone, PDA and a navigation system, which are capable of displaying various kinds of images such as a map image on the display for the use of the displayed image. The following description is made taking a personal computer as an example.

FIG. 1 illustrates a typical configuration of the personal computer. CPU 1, VRAM 2, ROM 3 and RAM 4 are connected to a bus B which is organized as a multitude of input/output lines made up of an address bus, a data bus and others. The bus B is connected to a display 5 through a display controller 6.

The bus B is further connected to a mouse 7, keyboard 8, flexible disk (FD) drive 9, CD-ROM drive 10 and hard disk (HD) 11 through the respective drivers, and a modem 12 through a communication controller 13.

The image data to be displayed on the display 5 is stored on the hard disk 11 or a CD-ROM loaded in the CD-ROM drive 10 or in a database or the like in an information-providing server which is connected to the computer through the Internet for providing a variety of image information.

The hard disk 11 captures and stores the image information from a storage medium such as a flexible disk loaded in the flexible disk (FD) drive 9 or a CD-ROM loaded in the CD-ROM drive 10, and also captures and stores required image information through the modem 12 from the information-providing server which is connected to the Internet for providing image information.

The CD-ROM, the hard disk 11 and the information-providing server which is connected to the computer through the Internet store the image data in the way described hereinafter in accordance with the present invention.

Figures 2, 3:
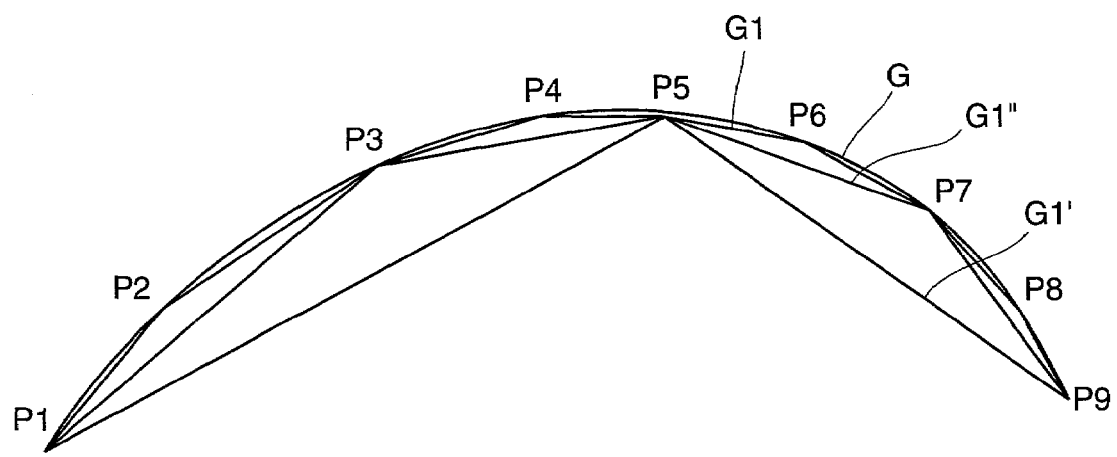
FIG. 2 is an explanatory diagram illustrating the principle of an image display according to the present invention.
FIG. 3 is a table showing an example of forms of image data storage according to the present invention.

It should be noted that the image generated from the vector data is displayed on the display 5 of the personal computer in the way schematically illustrated in FIG. 2.

In FIG. 2, a plurality of points P1 to P9 indicating given positions on a graphic G (a curve in the example of FIG. 2) are plotted on the display 5 and linked to define an approximate line G1 which approximately represents the graphic G.

The larger the number of points representing the image, the higher the precision of the image to be displayed.

Therefore, vector data DP1 to DP9 indicating the points PI to P9 for displaying the graphic G are classified under a plurality of groups (three groups in the example) according to the quality of an image to be displayed as illustrated in FIG. 3, and stored on the CD-ROM loaded in the CD-ROM drive 10 or hard disk 11.

Specifically, the group 1 classified includes the vector data DP1, DP5 and DP9 corresponding to indispensable points (the points P1, P5 and P9 in the example) for displaying an approximate line G1' required for a minimum recognition of the graphic G. The group 2 classified includes the vector data DP3 and DP7 indicating first supplementary points (the points P3 and P7 in the example) for supplementing the points P1, P5 and P9 represented by the vector data of group 1 to display an approximate line G1" which is closer to the graphics G than the approximate line G1'. The group 3 classified includes the vector data DP2, DP4, DP6 and DP8 indicating second supplementary points (the points P2, P4, P6 and P8 in the example) for supplementing the points P1, P3, P5, P7 and P9 represented by the vector data of groups 1 and 2 to display the approximate line G1 which is closer to the graphics G than the approximate line G1". The classified vector data are stored for each group.

In the personal computer, based on a program stored on the ROM 3, the CPU 1 reads the image data stored on the CD-ROM loaded in the CD-ROM drive 10 or on the hard disk 11, or downloads the image data through the modem 12 from the information-providing server connected to the Internet. Then, the CPU 1 expands the resulting image data in a vector memory area formed in a portion of the RAM 4, then performs the necessary processing on it, and then writes it onto the VRAM 2 for each screen.

The display controller 6 reads the image data written onto the VRAM 2 at regular intervals to form an image on the display 5.

When reading the image data from the CD-ROM or hard disk 11 or downloaded from the information-providing server connected to the computer through the Internet, the CPU 1 makes a selection between reading the vector data from only the group 1, reading the vector data from the groups 1 and 2, and reading the vector data from all the groups 1 to 3 in accordance with the user's need, the operation mode of the personal computer, the amount of image data to be downloaded, or the like, as described hereafter.

Specifically,

A) Case of Reading Only the Vector Data in Group 1

In the case, for example, of the need for displaying the image at high speed when the image is scrolled on the screen or when a high volume of data is received via the Internet, no need for displaying the image with high precision, the need for displaying the image quickly rather than with precision, or the need for displaying the image using a minimal amount of data depending upon e.g. memory size of the system when the data is received, the CPU 1 reads the vector data DP1, DP5, and DP9 classified into group 1 from the CD-ROM or hard disk 11 or the information-providing server connected to the computer through the Internet, to use the points P1, P5 and P9 for displaying the approximate line G1' (see FIG. 2) required for a minimum recognition of the graphic G on the display 5.

Thus, the required image is provided to the user in a short time. Further, fast data transfer is achieved by a saving in the buffer size when the data is transferred.

B) Case of Reading the Vector Data in Group 2 and Group 3 in Addition to Group 1

In the case, for example, of the need for displaying the image with a higher precision although a longer time is required, or of a large memory size in the system when the data is received, the CPU 1 reads the vector data DP3 and DP7 in the group 2 in addition to the vector data DP1, DP5 and DP9 in the group 1, to display the approximate line G1" (see FIG. 2) resulting from a supplement to the points P1, P5 and P9 represented by the vector data of the group 1 with the points P3 and P7 represented by the vector data of the group 2.

In the requirement of displaying the image with a further higher precision, the vector data DP2, DP4, DP6 and DP8 of the group 3 are also read for a display of the approximate line G1 which comes closest to the graphic G (see FIG. 2) resulting from supplementing the points P1, P3, P5, P7 and P9 represented by the vector data of the groups 1 and 2 with the points P2, P4, P6 and P8 represented by the vector data of the group 3.

If there is still extra time and/or memory capacity remaining after the approximate line G1' is plotted from the vector data of the group 1, the vector data of the groups 2 and 3 are read to re-display the image.

For this configuration, it is possible for the user to allow a display to display images with the precision meeting the user's need at the time.

It is possible for the user to enter a precision of an image to be displayed as described above through the mouse 7 or keyboard 8 to the personal computer.

For example, by selecting an icon indicating the image precision (high, medium, low) or an icon indicating the display speed (high, medium, low) displayed on the initial screen of the application software or on a Web page for receiving information from the information-providing server, the user can freely set the precision of the image to be displayed on the display 5 and the display speed.

Then, according to the set precision and display speed for the display image, the CPU 1 determines whether to read only the vector data of the group 1, read the vector data of the group 2 in addition to the group 1, or read the vector data of the group 3 in addition to the groups 1 and 2.

As well as the user freely set the precision and display speed of the display image as described above, in scrolling on the screen, the CPU 1 may automatically read only the vector data of the group 1 to set a display speed at a high speed.

The foregoing has described an example in which the image data is classified into three groups for display, but the image data may be classified simply into two groups. Further, in a display of a high-precision image, the image data can be classified into four or more groups.

The terms and description used herein are set forth by way of illustration only and are not meant as limitations. Those skilled in the art will recognize that numerous variations are possible within the spirit and scope of the invention as defined in the following claims.

What is claimed is:

1. A method of displaying a vector-mode image in which a plurality of points designated on a screen are linked to display the required image, comprising the steps of:

classifying vector data, indicating a plurality of points for displaying the image, into a first group of data and a second group of data, the first group of data has a number of the plurality of points, the number of plurality of points included in the first group of data is substantially equal to a predetermined number of points to define lines for constructing the image, and the second group of data comprising supplementary points disposed in-between the predetermined number of points for supplementing the first group of data to display a more precise construction of the image;

storing the vector data on a storage member; and selecting between displaying the image represented only by the first group of data and displaying the image represented by a combination of the first and second groups of data, when the image is displayed;

wherein the image is represented only by the first group of data when being scrolled on a screen.

2. The method of displaying the image according to claim 1, wherein the second group of data is classified into a plurality of data groups for supplementing the first group of data in stages for storage on the storage member, and a selection among the classified plural data groups indicating the supplementary points is made in stages for supplementing the first group of data in stages to display the image.

3. The method of displaying the image according to claim 1, wherein said selection between displaying the image represented by the first group of data and displaying the image represented by the combination of the first and second groups of data is made in accordance with the amount of data of the image.

4. The method of displaying the image according to claim 1, wherein said selection between displaying the image represented only by the first group of data and displaying the image represented by the combination of the first and second groups of data is made in accordance with data memory capacity required for displaying the image.

5. A system of displaying an image in which a plurality of points designated on a screen are linked to display the required vector image, comprising:
a data storage member classifying vector data, indicating a plurality of points for representing the image, into a first data group and a second data group, the first data group has a number of the plurality of points, the number of the plurality of points included in the first data group is substantially equal to a predetermined number of points to define lines for constructing the image, and the second data group comprising supplementary points disposed in-between the predetermined number of points for supplementing the first data group to represent the more precise construction of the image, and the data storage member storing the vector data; and
an image quality selection member for selecting between reading the first data group from said data storage member for displaying the image and reading the first and second data groups from said data storage member for displaying the image;
wherein said image quality selection member selects the image display represented only by the first data group when the image is scrolled on a screen.

6. The system of displaying the image according to claim 5, wherein said data storage member classifies the second data group, indicating the supplementary points, into a plurality of data groups for supplementing the first data group in stages and stores the second data group, and in the displaying of the image said image quality selection member selects among the classified plural data groups indicating the supplementary points in stages to supplement the first data group in stages.

7. The system of displaying the image according to claim 5, wherein said image quality selection member makes, in accordance with the amount of image data, the selection between displaying the image represented only by the first data group and displaying the image represented by a combination of the first and second data groups.

8. The system of displaying the image according to claim 5, wherein said image quality selection member makes, in accordance with data memory capacity required for displaying the image, the selection between displaying the image represented only by the first data group and displaying the image represented by the combination of the first and second data groups.

9. The system of displaying the image according to claim 5, wherein said data storage member is provided in a server providing image data through a computer network.

10. A system of displaying an image in which a plurality of points designated on a screen are linked to display the required vector image, comprising:
a data storage member for classifying vector data, indicating a plurality of points for representing the image, into a first data group, a number of the plurality of points for representing the image included in the first data group is a constant predetermined number of points to define lines for constructing the image, and a second data group comprising supplementary points disposed in-between the predetermined number of points for supplementing the first data group to represent a more precise construction of the image, and for storing the vector data; and
an image quality selection member for selecting between reading the first data group from said data storage member for displaying the image and reading a combination of the first and second data groups from said data storage member for displaying the image, wherein said image quality selection member selects the image display represented only by the first data group when the image is scrolled on a screen, such that when the image is scrolled on the screen, a number of the plurality of points representing the image remains constant throughout the scrolling of the image on the screen.

* * * * *